Dec. 18, 1951
V. K. BABAYAN
CYCLIC REUSE OF CYCLOHEXYLAMINE IN ROSIN ACIDS SEPARATION
Filed Sept. 1, 1949
2,578,661
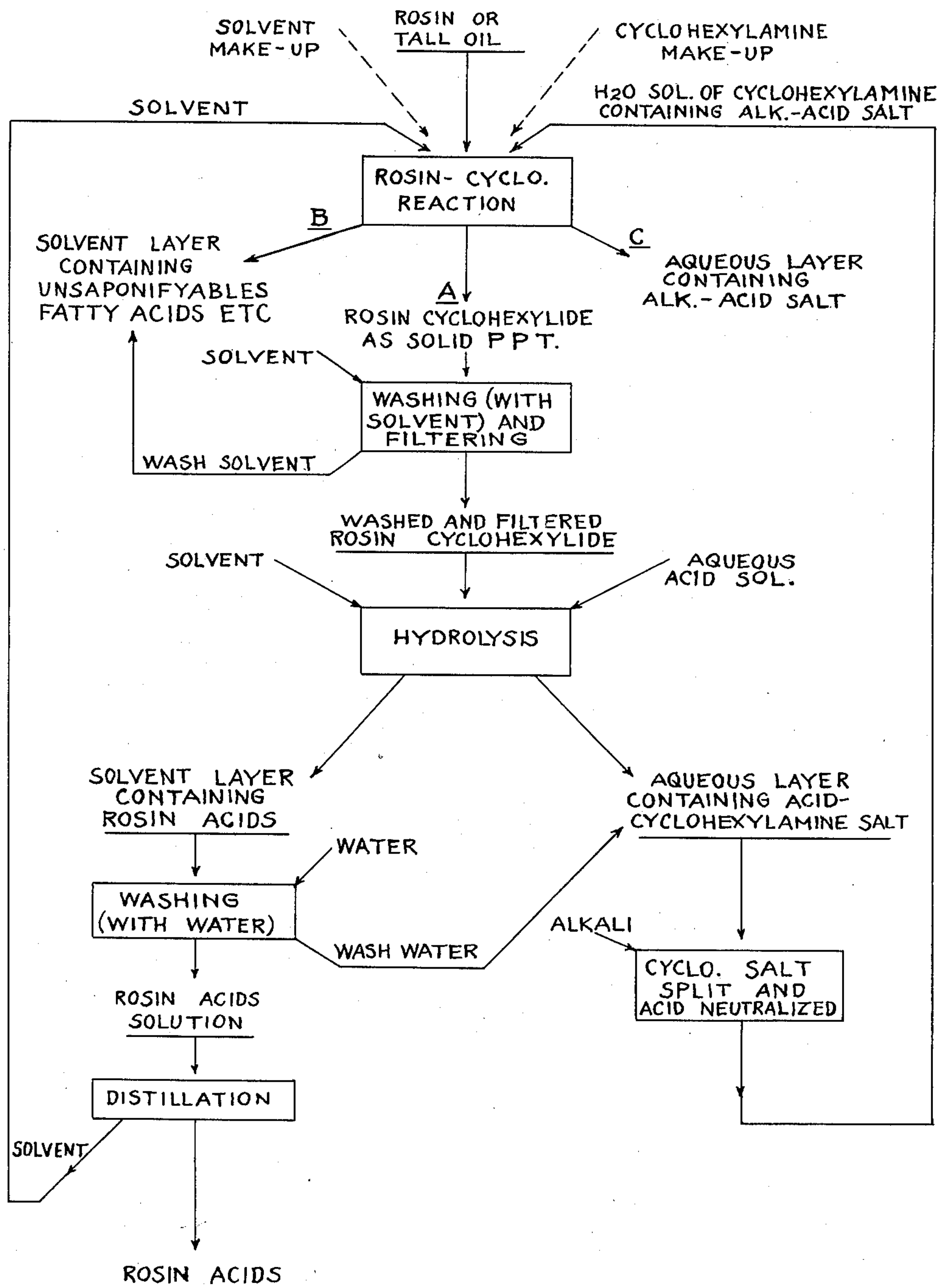
INVENTOR
Vigen K. Babayan
BY
ATTORNEYS Patented Dec. 18, 1951 2,578,661

UNITED STATES PATENT OFFICE 2,578,661

CYCLIC REUSE OF CYCLOHEXYLAMINE IN ROSIN ACIDS SEPARATION

Vigen K. Babayan, West Englewood, N. J., assignor, by mesne assignments, to The Fulwal Chemical Corporation, New York, N. Y., a corporation of Delaware Application September 1, 1949, Serial No. 113,540

5 Claims. (Cl. 260—97.6)

This invention relates to a cyclic process for re-using cyclohexylamine employed in the separation of rosin acids from mixed materials containing rosin acids.

In copending application of Nicholas L. Kalman, deceased, Serial No. 789,137, filed December 1, 1947, now U. S. Patent No. 2,532,101 and assigned to the assignee of the present application, there is disclosed a method for separating rosin acids from mixed materials containing such acids, which method comprises reacting the mixed materials in an organic solvent, with cyclohexylamine, to thereby form the rosin cyclohexylide. The solvent employed is one in which the mixed materials are soluble but in which the cyclohexylide formed is insoluble, whereupon the cyclohexylide precipitates. The cyclohexylide may thereafter be hydrolyzed to recover the pure rosin acids.

As disclosed in said copending application, this treatment is highly effective for separating rosin acids in pure form from such mixed materials as tall oil and various grades of commercial rosin, including disproportionated or hydrogenated rosin products.

As is known, tall oil, a by-product of paper manufacture, constitutes a sludgy mass of dark color and foul odor, the tall oil usually consisting of about 45% rosin acids, about 45% fatty acids, and about 10% of other ingredients and impurities, including rosin hydrocarbons and oxy acids, sterols, color and odor bodies, dirt, etc.

The process of the invention is highly effective in separating out pure rosin acids from materials such as tall oil.

The invention is further useful in separating out pure rosin acids from commercial rosins, such as gum and wood rosins, which contain appreciable quantities of contaminants or impurities, notably, rosin hydrocarbons and color bodies.

Still further the invention is useful in separating out pure rosin acids from other rosin products, such as disproportionated or hydrogenated rosin products, for instance, rosins which have been treated to increase the content of dehydroabietic acid, as by disproportionation, effected for instance, by treatment with sulfur dioxide, as disclosed in Kalman Patent No. 2,395,278, issued February 19, 1946. In the separation of rosin acids from a specially treated rosin product of this kind, the separation is of especial advantage, since it enables obtaining a purified rosin acid product having a very high content of dehydroabietic acid.

The cyclohexylamine treatment is effective to separate rosin acids from rosin bearing materials for the following reasons:

While the cyclohexylamine reacts with various acids including certain organic acids sometimes present in admixture with rosin acids (for instance in tall oil), the cyclohexylamine salts of most of the organic acids are either liquid or are soluble in many solvents. However, the cyclohexylamine salts of the rosin acids are solids and substantially insoluble in a number of solvents. Therefore, the treatment with cyclohexylamine is effective to isolate and purify rosin acids from other components including other organic acids, such treatment resulting in precipitation of the rosin cyclohexylide. The precipitate may then be washed with a liquid which is a solvent for the other components until a cyclohexylamine salt of high purity is obtained. The rosin acids may then be recovered in pure form by hydrolyzing the cyclohexylamine salt.

In the cyclohexylamine separation of rosin acids, as above referred to, from the economic standpoint it is of great importance to recover the cyclohexylamine, since this material is relatively expensive. The present invention is concerned with a cyclic system for re-using the cyclohexylamine in the separation of rosin acids from any of the materials referred to above or from other similar mixed materials containing such rosin acids.

Briefly, the process of the invention proceeds as follows:

The rosin-bearing material is dissolved in an organic solvent in which the rosin cyclohexylide is insoluble, and cyclohexylamine is added to the solution, whereupon the rosin cyclohexylide precipitates. The precipitate is hydrolyzed with an aqueous solution of a hydrolyzing acid and in the presence of a solvent for the rosin acids, after which, stratification yields a solvent layer containing the rosin acids and an aqueous layer containing the reaction product of the cyclohexylamine and the hydrolyzing acid. The aqueous layer is separated and alkali is added thereto in an amount substantially equal to that required to neutralize the quantity of hydrolyzing acid employed, whereupon an aqueous solution is formed containing the reaction product of the hydrolyzing acid and the alkali and also containing the liberated cyclohexylamine. This solution is then used as such by mixing it with a solution of additional mixed material containing rosin acids, whereupon the cyclohexylamine reacts with the rosin acids to form additional cyclohexylide which, in its turn, is hydrolyzed, and treated according to the steps already outlined above. Since the mineral acid used for the hydrolysis of the cyclohexylamine salt and the alkali subsequently used for its neutralization form a neutral salt, they do not interfere in the reaction of the liberated cyclohexylamine with an additional amount of rosin acids dissolved in a solvent.

The foregoing steps of the process of the invention and also certain other steps are diagrammed in the flow sheet shown in the accompanying drawing.

For the purpose of the following description of an illustrative treatment, it is assumed that the treatment is being applied to a disproportionated rosin material or product containing rosin hydrocarbons. The rosin product is first advantageously dissolved in a solvent, for instance hexane, and cyclohexylamine is added to the solution in an amount preferably slightly less than that amount corresponding to a mol to mol ratio of cyclohexylamine to rosin acids present in the product being treated. This ensures reaction of all of the cyclohexylamine. The reaction is exothermic and it is therefore preferred to add the cyclohexylamine slowly, with stirring, to avoid excessive rise of temperature above room temperature. Temperatures in the neighborhood of room temperature or slightly higher are conveniently and effectively used. After the reaction is completed, the batch is permitted to settle and the rosin cyclohexylide precipitates, being insoluble in the hexane, although the rosin hydrocarbons (and other materials which may be present) being soluble in the hexane remain in the solution. The rosin cyclohexylide is then separated out, for instance by filtering, yielding the rosin cyclohexylide as a solid precipitate, as indicated at A in the flow sheet. The solution may be drawn off as indicated at B.

It is here pointed out that the foregoing description of the initial reaction is representative of the manner in which the treatment cycle is started. When the cyclohexylamine has ultimately been separated for re-use, it is returned to the rosin-cyclohexylamine reaction vessel in aqueous solution, in which event, settlement of the batch in the reaction vessel yields two liquid layers including both the solvent layer and an aqueous layer, the latter containing certain other constituents referred to more fully herebelow. In any event, after completion of the rosin-cyclohexylamine reaction following the second or succeeding re-use of the cyclohexylamine, both of the liquid layers are drawn off, as is indicated in the flow sheet by the letters B and C.

Proceeding now with the treatment of the rosin cyclohexylide derived as indicated at A in the flow sheet, this solid precipitate is preferably washed with solvent, advantageously the same solvent initially used (hexane in the example here being considered) and the cyclohexylide is filtered out. The solvent used for washing may be combined with the solvent layer B above referred to.

The rosin cyclohexylide is next hydrolyzed in the presence of solvent, again preferably the same solvent as used before (hexane in this example). For the purpose of hydrolysis the invention contemplates employment of an aqueous solution of the hydrolyzing acid, for instance sulfuric acid, and after completion of this reaction the batch is permitted to settle and two clear layers result. The top layer (comprising the solvent) contains the rosin acids resulting from the hydrolysis; and the bottom layer (comprising the water present) contains the cyclohexylamine in the form of the cyclohexylamine salt of the hydrolyzing acid. These two layers are separated. The aqueous layer is then treated by addition of an alkali, for instance sodium hydroxide, in consequence of which the cyclohexylamine salt of the hydrolyzing acid is split and the acid neutralized, yielding an aqueous solution containing cyclohexylamine as such and also containing the reaction product of the hydrolyzing acid and the alkali (in the example here given, sodium sulfate). This solution is then re-used as such to react with fresh batches of mixed materials in order to separate the rosin acids therefrom.

Following separation of the solvent layer derived from the hydrolysis, the solution of the rosin acids is preferably washed with water. This wash water is advantageously combined with the aqueous layer derived from the hydrolysis, as is indicated in the flow sheet. The rosin acids solution may then be distilled and the solvent recovered for re-use, as is also indicated in the flow sheet.

The foregoing illustrative treatment has been described in connection with the treatment of a rosin, specifically a disproportionated rosin; and in the description of the illustrative treatment, it is mentioned that it would ordinarily be preferred to use a quantity of cyclohexylamine slightly less than that required to react with the rosin acids present. In the case of application of the treatment to certain other materials, for example tall oil, the quantity of cyclohexylamine employed may advantageously be somewhat greater. In the case of treatment of tall oil, it must be remembered that the cyclohexylamine will also react with fatty acids present, although the reaction with the fatty acids will yield a reaction product which is soluble in solvents of the kind contemplated; and this difference in solubility characteristics between the fatty acid and the rosin acid reaction products will serve to secure a separation of the two components, as a result of the precipitation of the rosin cyclohexylide. Moreover, in tall oil treatment, the use of an excess of cyclohexylamine is of especial advantage because of the fact that the fatty acid component may be separated and recovered in purer form (i. e., with a smaller content of rosin acids), since the presence of excess cyclohexylamine assures reaction with all of the rosin acids present.

When treating tall oil, moreover, the invention contemplates that a sufficient quantity of cyclohexylamine be used so as to react not only with all of the rosin acids present but even with all of the fatty acids present, in which event most if not all of the fatty acid component may be isolated and recovered from the fatty acid reaction product following separation of the solvent layer as indicated at B in the accompanying drawing. If desired, the fatty acid reaction product may also be hydrolyzed in a manner similar to that described with reference to the rosin reaction product, and the recovered cyclohexylamine re-used in the same general way.

With still further reference to the illustrative processing referred to just above, two additional points are of especial importance. First, the quantity of alkali added to the aqueous layer derived from the hydrolysis should quite accurately approximate that required to neutralize the quantity of hydrolyzing acid used. By employing this stoichiometric quantity of alkali all of the cyclohexylamine is released for re-use and at the same time the introduction of the aqueous solution into the rosin-cyclohexylamine reaction vessel will not introduce excess alkalinity which would tend to develop soaps in the reaction vessel. The presence of such soaps would interfere with the stratification and filtering steps which follow the reaction between the cyclohexylamine in the aqueous solution and the additional batches of mixed materials being treated.

A further important factor is that the content of the reaction product of the hydrolyzing acid with the alkali in the aqueous layer derived from the hydrolysis should be relatively low, preferably below 1 normal. This also makes for easy handling of processing steps when the aqueous solution containing the cyclohexylamine is re-used.

After re-use of the aqueous solution containing the cyclohexylamine, the aqueous layer which is drawn off from the rosin-cyclohexylamine reaction vessel, as indicated at C in the flow sheet, contains the reaction product of the alkali and the hydrolyzing acid, i. e., in the illustrative example here being considered sodium sulfate and this layer may then be discarded.

By following the process outlined above it is possible to carry through the cycle with less than 3% loss of the cyclohexylamine. Indeed, with carefully controlled conditions it is possible to recover as much as 99% of the cyclohexylamine for re-use after each cycle.

In connection with various of the materials used in the process and also in connection with certain collateral matters regarding the process, the following should be noted. The solvent employed may be any of quite a wide variety of organic solvents in which the mixed materials are soluble but in which the rosin cyclohexylide is insoluble. The rosin cyclohexylide is characterized by insolubility in many solvents, in view of which a wide choice of solvents is available. Appropriate solvents include hydrocarbon solvents such as hexane, naphtha, gasoline, mineral spirits and petroleum ether. Of especial importance and advantage are those solvents which are highly immiscible with water, for instance the aliphatic hydrocarbon solvents such as hexane, naphtha and gasoline.

The quantity of rosin or tall oil initially placed in solution may be sufficient to yield a solution containing anywhere up to about 40% of the rosin or tall oil. Usually 15 to 30% will be found to provide a solution of sufficiently low viscosity to enable ready separation of the rosin-cyclohexylide precipitate.

The solvent layer derived from the rosin-cyclohexylamine reaction may be treated to recover other constituents therefrom, such for instance as the fatty acids, in the case of treating tall oil, rosin hydrocarbons, sterols, etc., according to the content of the initial material, and in addition if desired the solvent itself may be recovered for re-use.

The solvent washing of the cyclohexylide precipitate may be repeated, as desired, until a product of high purity is ensured.

The hydrolyzing acid employed may be any of the water soluble acids usually employed for such hydrolysis, including the mineral acids such as sulfuric acid and hydrochloric acid. The content of hydrolyzing acid in the aqueous solution introduced for hydrolysis may be from 1 to 10% of the solution, for instance 5%. It will be understood, of course, that sufficient of this aqueous solution is introduced to effectively react with all of the rosin cyclohexylide present, in order to achieve a high yield of rosin acids.

The solvent introduced into the hydrolyzing reaction should be sufficient to readily dissolve all of the rosin acids liberated.

The alkali employed for splitting the cyclohexylamine salt of the hydrolyzing acid may be any of the inexpensive alkalies employed for such purposes, for instance sodium hydroxide, potassium hydroxide and sodium carbonate. These yield water soluble reaction products with the hydrolyzing acid. As an alternative calcium oxide or hydroxide may be used in which event a water insoluble reaction product is formed, which may readily be eliminated from the solvent layer and the aqueous layer.

EXAMPLES

*Example I*

In this example the rosin bearing material treated according to the invention was a disproportionated rosin prepared with palladium-charcoal catalyst.

A batch of 350 g. of the disproportionated rosin was dissolved in 1100 g. of hexane and 100 g. of cyclohexylamine were added to this solution. The quantity of disproportionated rosin referred to (350 g.) represented 302 g. of rosin acids, i. e., about 1 mol, the balance being chiefly rosin hydrocarbons. When accounting for impurities, the quantity of cyclohexylamine referred to (100 g.) represents about 99 g. of pure cyclohexylamine, i. e., about 1 mol. The treatment described above and illustrated in the accompanying flow sheet was carried out, the hydrolysis being effected with an aqueous solution comprising 1000 ml. of water and 55 g. of sulfuric acid. The theoretical quantity of sodium hydroxide required to neutralize the sulfuric acid employed was added to the aqueous layer secured from the hydrolysis, and the resulting aqueous solution containing cyclohexylamine and sodium sulfate was re-used in the treatment of an additional batch of 400 g. of the same disproportionated rosin dissolved in 1100 g. of hexane, no additional cyclohexylamine being added. The treatment was carried through a second time, in the manner described above, and this was repeated until the cyclohexylamine had been used six times. After the sixth use of the cyclohexylamine, 88.25% of the initial quantity was still present in the system.

*Example II*

In this example various of the treatment steps of the cyclic method of the invention were utilized, beginning with hydrolysis of a previously formed batch of the cyclohexylamine salt of a disproportionated rosin. In this case, the disproportionated rosin was prepared by treatment with $SO_2$ according to the method of the Kalman Patent No. 2,395,278.

383 g. of the above mentioned rosin cyclohexylamine salt was added gradually with stirring to a previously mixed batch of 800 cc. of water, 50 g. of sulfuric acid and 400 g. of naphtha. After addition of the cyclohexylamine salt, a further mixture of 100 cc. of water, 5 cc. of concentrated sulfuric acid and 200 cc. of naphtha was added and the entire mixture stirred for 2½ hours.

Upon standing the mixture formed two clear layers and it was then transferred to a separatory funnel and allowed to settle for 15 minutes, at which time the water layer was drawn off. The naphtha layer, containing the hydrolyzed rosin acids, was given four water washes using 200 cc. of water in all; and the water from the final wash was neutral.

15 g. of sodium hydroxide was then added to a batch comprising ⅓ of the aqueous solution separated as just above, to thereby neutralize the acid and form a solution of the cyclohexylamine in aqueous sodium sulfate. To this was added 129 g. of disproportionated rosin (also prepared according to the said Kalman patent) dissolved in 400 cc. of naphtha. The mixture was stirred until the cyclohexylamine salts of the rosin acids precipitated, and a further 100 cc. of naphtha was added to dissolve any remaining rosin acids, the total amount of cyclohexylamine present being sufficient to precipitate only 127.67 g. of newly formed rosin cyclohexylamine salts.

The above mixture was then filtered and the precipitate washed several times with water. During the filtration it appeared that some of the rosin acids remaining tended to clog the filter paper. Nevertheless, 120 g. of rosin cyclohexylamine salt was recovered, indicating 93.99% recovery of the cyclohexylamine.

*Example IIa*

The latter portion of the procedure according to Example II was repeated, using the balance of the aqueous sodium sulfate-cyclohexylamine solution and double the quantities of disproportionated rosin acids and naphtha.

Upon this repetition, 254.7 g. of the rosin cyclohexylamine salts were obtained, out of a theoretically possible 255.33 g., thus indicating 97.05% recovery of the cyclohexylamine.

*Example III*

Here disproportionated rosin was again treated, the rosin having been prepared by the use of palladium-charcoal catalyst.

120 g. of the disproportionated rosin was dissolved in 600 g. of hexane and 33.3 g. of cyclohexylamine (tech. 98%) were added.

On the basis of the molecular weight of the rosin acids initially present, and calculating mol for mol of pure cyclohexylamine to rosin acids, the 32.6 g. of pure cyclohexylamine would be capable of yielding 98.9 g. of rosin acids.

After the addition of the cyclohexylamine (which was added slowly with agitation) a fine white precipitate formed and the precipitate was filtered and washed with hexane.

The cyclohexylamine salts were then hydrolyzed in aqueous sulfuric acid (16.47 g.). Hexane was added to this solution to dissolve the precipitated rosin acids and two clear layers formed, one being hexane containing the rosin acids and the other an aqueous solution. The aqueous solution was drawn off from the separatory funnel and the hexane layer was washed several times with water to neutrality. The aqueous solution and the wash waters were combined and sufficient sodium hydroxide was added to neutralize the acid (13.3 g. NaOH).

95 g. of rosin acids were recovered, which is 96.1% of the possible amount.

An additional batch of 120 g. of the same type of disproportionated rosin dissolved in 600 g. of hexane was then added to the aqueous cyclohexylamine-sodium sulfate solution. The hydrolysis and other following steps were then repeated and the rosin acids obtained were found to be 95 g., which was quantitative from the first run of this group, indicating a 96.1% overall recovery of the cyclohexylamine, after using the cyclohexylamine three times.

*Example IV*

In this example the same disproportionated rosin as used in Example III was again treated, the treatment being carried out in the manner similar to that described in connection with Example III.

Here, however, larger batches were employed and naphtha was employed as solvent instead of hexane.

Thus, 350 g. of the disproportionated rosin was dissolved in 700 g. of naphtha and 100 g. of cyclohexylamine (tech. 96%) were added.

The cyclohexylamine reaction product was worked up in the same general way as described in Example III, and the recycling was repeated six times.

In each cycle the cyclohexylamine reaction product was washed with fresh naphtha.

1000 g. of naphtha was used in each hydrolysis.

55 g. of $H_2SO_4$ was also used in each hydrolysis; and 44.9 g. of NaOH was used in each cycle to neutralize the acid solution.

The aqueous cyclohexylamine-sodium sulfate solution secured in each cycle was kept at or slightly below 1 normal. In all but the first cycle, 350 g. of disproportionated rosin was dissolved in 1000 g. of naphtha.

After the sixth hydrolysis the recovered rosin acids were dried and weighed. This yielded 291.5 g. of rosin acids, the theoretical yield being 297.5 g., thereby indicating an overall recovery of the cyclohexylamine, after six cycles, of 98%.

The foregoing shows that cyclic re-use of cyclohexylamine according to the invention, when run in a closed system, results in practically quantitative recovery and re-use of the cyclohexylamine.

I claim:

1. A cyclic process for re-using cyclohexylamine for the separation of rosin acids from mixed materials containing rosin acids, which process comprises reacting the cyclohexylamine with a solution of such mixed materials, hydrolyzing the rosin cyclohexylide formed by said reaction by treating the cyclohexylide with a hydrolyzing acid in aqueous solution, separating the resulting rosin acids from the resulting aqueous solution of the cyclohexylamine-acid salt, adding alkali to said solution to form an aqueous solution of the neutral salt of the hydrolyzing acid and of the liberated cyclohexylamine, and mixing said last aqueous solution with a solution of mixed materials containing rosin acids to thereby re-use the cyclohexylamine for separation of rosin acids.

2. A cyclic process according to claim 1 in which the amount of said alkali added is substantially that amount required to neutralize the hydrolyzing acid present.

3. A cyclic process according to claim 1 in which the aqueous solution containing the cyclohexylamine and the reaction product of the alkali with the hydrolyzing acid contains sufficient water to provide a concentration of said reaction product below 1 normal.

4. A cyclic process according to claim 1 in which the mixed materials treated comprise tall oil and in which the quantity of cyclohexylamine used approximates that required to react with both the fatty acid and rosin acid constituents of the tall oil.

5. A cyclic process according to claim 1 in which the mixed materials treated comprise rosin and in which the quantity of cyclohexylamine used is slightly less than that required to react with all of the rosin acids present.

VIGEN K. BABAYAN.

REFERENCES CITED

The following references are of record in the file of this patent:

UNITED STATES PATENTS

| Number | Name | Date |
| --- | --- | --- |
| 2,419,211 | Harris | Apr. 22, 1947 |